United States Patent [19]

Fogg, Jr. et al.

[11] Patent Number: 5,008,816
[45] Date of Patent: Apr. 16, 1991

[54] DATA PROCESSING SYSTEM WITH MULTI-ACCESS MEMORY

[75] Inventors: Richard G. Fogg, Jr.; John W. Irwin, both of Austin, Tex.

[73] Assignee: International Business Machines Corporation, Armonk, N.Y.

[21] Appl. No.: 117,715

[22] Filed: Nov. 6, 1987

[51] Int. Cl.$^5$ .................. G06F 12/00; G06F 15/16; G06F 13/10
[52] U.S. Cl. .................. 364/200; 364/237.2; 364/228.6; 364/244.3; 364/244; 364/284; 364/284.1; 364/284.2; 364/245.5; 364/245.6
[58] Field of Search ... 364/200 MS File, 900 MS File

[56] References Cited

U.S. PATENT DOCUMENTS

| | | | |
|---|---|---|---|
| 4,209,839 | 6/1980 | Bederman | 364/200 |
| 4,291,371 | 9/1981 | Holtey | 364/200 |
| 4,325,116 | 4/1982 | Kranz et al. | 364/200 |
| 4,371,929 | 2/1983 | Braun et al. | 364/200 |
| 4,392,200 | 7/1983 | Arulpragasam et al. | 364/200 |
| 4,410,944 | 10/1983 | Kronies | 364/200 |
| 4,442,487 | 4/1984 | Fletcher et al. | 364/200 |
| 4,445,174 | 4/1984 | Fletcher | 364/200 |
| 4,586,133 | 4/1986 | Steckler | 364/200 |
| 4,685,082 | 8/1987 | Cheung et al. | 364/49 |
| 4,757,441 | 7/1988 | Buckland et al. | 364/200 |

OTHER PUBLICATIONS

IBM Technical Disclosure Bulletin, vol. 26, No. 10B, Mar. 1984, Entitled "Probabilistic Updating for IN-Store Cache Cross-Interrogation", by M. A. Krygowski.
IBM Technical Disclosure Bulletin, vol. 23, No. 7A, Dec. 1980, "System Cache for High Performance Processors", by S. M. Desai.
IBM Technical Disclosure Bulletin, vol. 25, No. 3B, Aug. 1982, "Read-Only Bypass of Cache" by A. H. Duke et al.
IBM RT Personal Computer Technology, Form No. SA23-1057, "Use of a Coprocessor for Emulating the PC AT", by John Irwin.
IBM RT Personal Computer Technology, Form No. SA23-1057, "Coprocessor Software Support", by R. Krishnamurty et al.

Primary Examiner—Gareth D. Shaw
Assistant Examiner—Paul Kulik
Attorney, Agent, or Firm—Thomas E. Tyson

[57] ABSTRACT

A memory system that includes several memory locations connected to a reading circuit that provides read access to the memory location. The memory system also includes the controller that receives control information. A writing circuit is further included that provides write access to either only a first portion of the memory locations, or simultaneously several portions of the memory locations is designated by the control information. This invention further includes a memory system that provides several memory locations for the storage of information together with the controller having a first port and a second port. The first port provides access to the memory locations in response to a first address range and the second port provides access to the memory locations in response to several address ranges wherein at least one of the address ranges of the second port is different then the address range of the first port. Still further, the invention includes a memory system having a first group of memory locations that store information in accordance with the first address range and a second group of memory locations. The two groups of memory locations are connected to a controller that provides write access to the first group of memory locations in a response to write commands having addresses within the first address range and, simultaneously writing each write command address in the second group of memory locations.

8 Claims, 10 Drawing Sheets

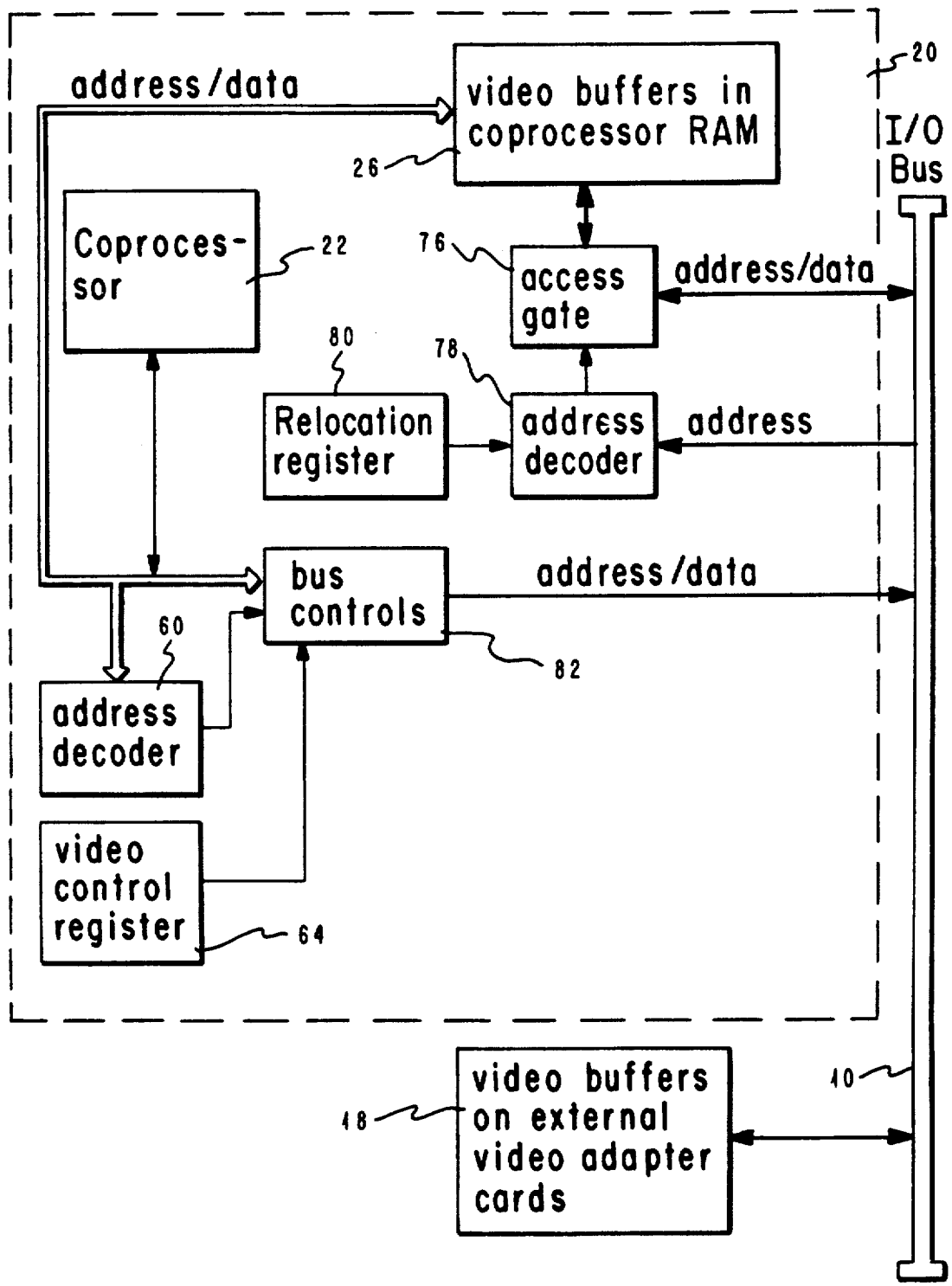
F I G. 7

DATA PROCESSING SYSTEM WITH MULTI-ACCESS MEMORY

DESCRIPTION

DATA PROCESSING SYSTEM WITH MULTI-ACCESS MEMORY

1. Technical Field

This invention relates to a data processing memory system and more specifically to a memory system for a data processing configuration including multiple processing units.

2. Background Art

The traditional data processing system includes a single central processing unit with a memory having addressable storage for the storage of information that includes instructions, data and other memory addresses. In this configuration, a memory controller provides access to the memory storage locations for the central processing unit. The central processing unit accesses the memory locations through the memory controller to read and write information within the memory.

A multiprocessor configuration also includes a memory and a memory controller. However, because of the multiple processing units all requiring access to memory storage locations, the function of the memory controller becomes more complex. In some multiprocessing configurations, each processor is assigned a separate and independent memory that is dedicated to that single processor. However, in the more advanced multiprocessing configurations, memory locations are shared among several processors.

The IBM RT Personal Computer is a workstation data processing system having a unique processor. This new RT processor cannot run object code assembled or compiled for older processors such as the IBM PC AT. However, the RT PC workstation provides a coprocessor environment that includes the IBM PC AT processor to run existing code for the IBM PC AT or other Intel 80286 microprocessor based devices. The AT coprocessor is configured with an input/output (I/0) channel to communicate with the RT processor. This arrangement requires a special memory environment described in the publication *IBM RT Personal Computer Technology*, form number SA23-1057, which contains two articles addressing the AT coprocessor. The first is entitled "Use of a coprocessor for emulating the PC AT" by John W. Irwin and the second is "Coprocessor Software Support" by Rajan Krishnamurty and Terry Mothersole.

The objective of the present invention is to still further enhance the operation of the RT processor with the AT coprocessor.

The prior art technology area includes U. S. Pat. No. 4,392,200 entitled "Cached MultiProcessor System with Pipeline Timing" that describes a multiprocessing system that shares a common control unit including a write-through cache memory. The memory management circuit and the cache are used in a pipeline sequence by the processor.

U.S. Pat. No. 4,209,839 entitled "Shared Synchronous Memory MultiProcessing Arrangements", discloses a multiprocessing system having shared memory between the processor that synchronizes memory interfaces. This allows processors to share memory associated with other processors.

IBM Technical disclosure Bulletin entitled "Read-Only Bypass of Cache", volume 25, number 3B, August 1982, discloses a cache with a background and a storing device. The memory controller directs a using device to either the cache or to the background store while disabling any writing until the background is stored by the user device.

DISCLOSURE OF THE INVENTION

In accordance with the present invention a memory system is provided that include several memory locations that store information. A reading circuit is connected to the memory locations for providing read access. The controller circuit is provided to receive control information. A writing circuit connected to the memory provides write access capability in accordance with the control information in the controller circuit. In a first mode specified by the control information, the writing circuit writes only to a first portion of the memory locations. In a second mode the writing circuit writes simultaneously to several memory locations.

Also, in accordance with this invention a memory system is provided that includes at least one memory location to store information together with a memory controller that receives memory access commands and provides access to at least one memory location through a first port and through a second port. The first port provides access to this at least one memory location in response to memory access commands having addresses within a first address range. The second port provides access to at least one memory location in response to memory access commands having addresses within any one of several addressed ranges where the several addressed ranges includes at least one address range that is different from the first address range.

Still further in accordance with the present invention, a memory system is provided that includes a first group of memory locations that store information in response to access commands that have addresses within a first address range, and a second group of memory locations. Write circuitry is provides for processing write commands to provide information to the first group of memory locations. This circuitry also simultaneously writes the addresses from these write commands in the second group of memory locations. The second group of memory locations serve as a queue for storing the addresses of the changes made in the first group of memory locations.

BRIEF DESCRIPTION OF DRAWING

The novel features of the invention are set forth in the appended claims. The invention itself, however, as well as other features and advantages thereof, will best be understood by reference to the detailed description which follows, read in conjunction with the accompanying figures, wherein:

FIG. 7 is a block diagram of the coprocessor, the video buffer access circuitry and the write through control circuit;

BEST MODE FOR CARRYING OUT THE INVENTION

Figure 1:
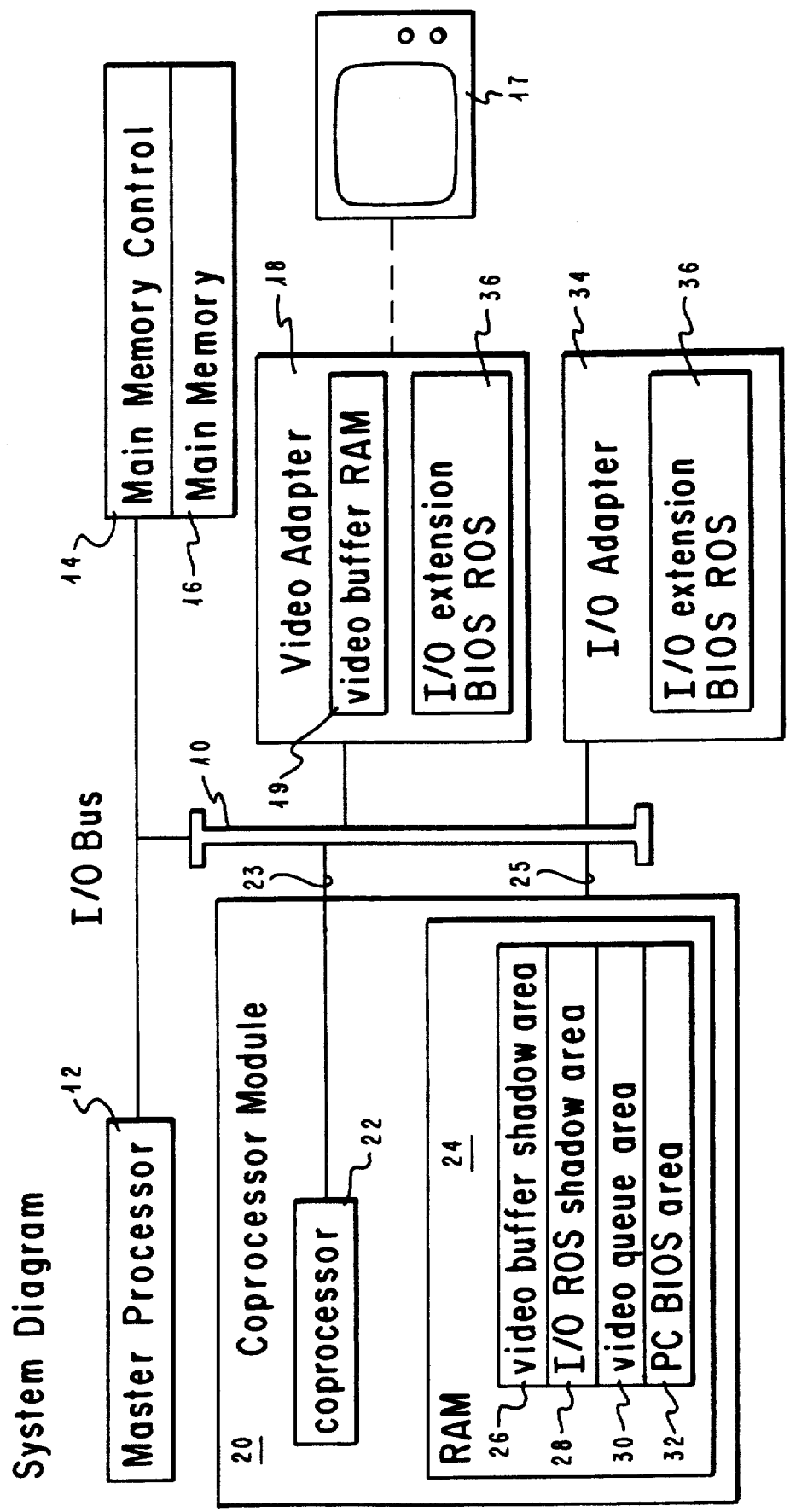
FIG. 1 is a system block diagram of a multiprocessing system.

This invention relates to a memory system for a multiprocessing configuration. The typical multiprocessor system includes several independent processors interconnected on information bus. Commonly, the information bus is also connected to several input/output (I/O) devices and other memory devices, such as a mass memory. FIG. 1 illustrates one such multiprocessing system. Specifically, FIG. 1 illustrates the architecture for the present invention as embodied in a IBM RT PC workstation. The IBM RT PC includes a master processor 12 that is connected to a main memory control 14 to a main memory 16 and an information I/O bus 10. Additionally, in this configuration illustrated in FIG. 1, the system includes a coprocessor module 20 consisting of a coprocessor 22 and memory 24. In the configuration of FIG. 1, the coprocessor module is connected to the I/O bus 10 by line 25. Additionally, the coprocessor 22 itself, is connected to the I/O bus 10 by line 23 indicating independent access by the coprocessor 22. Further, the multiprocessor system in FIG. 10 includes I/O adapter 34 connected to the I/O bus 10. I/O adapters 34 includes an I/O extension memory 36 that includes extensions to the operating system for the coprocessor module 20 in Read only storage (ROS) 36. A video adapter 18 is also connected to the I/O bus 10 and is further connected to a display 17. The information for the display 17 is contained in a memory 19 acting as a buffer. The video adapter 18 may also contain an I/O extension memory 36. Each separate adapter type having I/O expansion ROS responds to a different low address range to avoid conflict.

In operation, the master processor 12 would provide display information through the video adapter 18 to the video buffer RAM 19 for display 17. However, when the coprocessor module is included, the capability exists for the coprocessor 22 to provide its own display through the video adapter 18. In order to facilitate the interoperation between the master processor 12 and the coprocessor 22 in such a manner that minimizes the amount of traffic on the I/O bus 10, a special feature is provided wherein the coprocessor 22 is allowed to store its video display data in the coprocessor module RAM 24 as a video buffer shadow area 26. Therefore, when the coprocessor 22 controls video adapter 18, the video buffer shadow area 26 maintains a record of data written to the display 17. When the master processor 12 controls video adapter 18, the coprocessor 22 is blocked from writing to buffer 19. The video buffer shadow area 26 continues to maintain a record of the coprocessor video output. When control of video adapter 18 is again passed from master processor 12 to coprocessor 22, master processor 12 stops coprocessor 22 momentarily and copies video buffer shadow area 26 to video adapter 18 before reenabling coprocessor 22 access to video buffer 19. When control of video adapter 18 is passed from coprocessor 22 to master processor 12, no copy operation is required since video adapter shadow buffer 26 contains a correct record of the video display contents.

The video adapter card may be of a type not supported by the software in coprocessor 22. For instance, video adapter 18 may be an all points addressable (APA) display while the code running in coprocessor 22 supports only a character display. In this event, coprocessor 22 is blocked from writing into video buffer RAM 19 and the main processor 12 translates the contents of video shadow buffer 26 and places the translated image in video adapter RAM 19 in a form suitable for APA display.

An interrupt is provided to the master processor each time the coprocessor writes into video shadow buffer 26. If the master processor 12 attempted to translate the entire display buffer each time it is changed, the work load on master processor 12 and I/O Bus 10 would be prohibitive. For this reason, a video queue area 30 and associated circuitry provide a list of changed characters in video buffer shadow area 26. It is these changes that are then used to update video buffer RAM 19.

Additionally, the coprocessor module 20 RAM 24 includes a I/O ROS (read only storage) shadow area 28. The memory area 28 is for the storage of the BIOS from the I/O extension ROS 36. The BIOS is loaded by the master processor 12 over the I/O bus 10 when the coprocessor module 20 is initialized. This BIOS area 28 is in addition to the normal PC BIOS area 32 that is also provided. In the preferred embodiment, the coprocessor 22 is an INTEL 80286. In accordance with the architecture of the 80286, the location of the PC BIOS area 32 within the memory 24 is predetermined.

Figure 2:
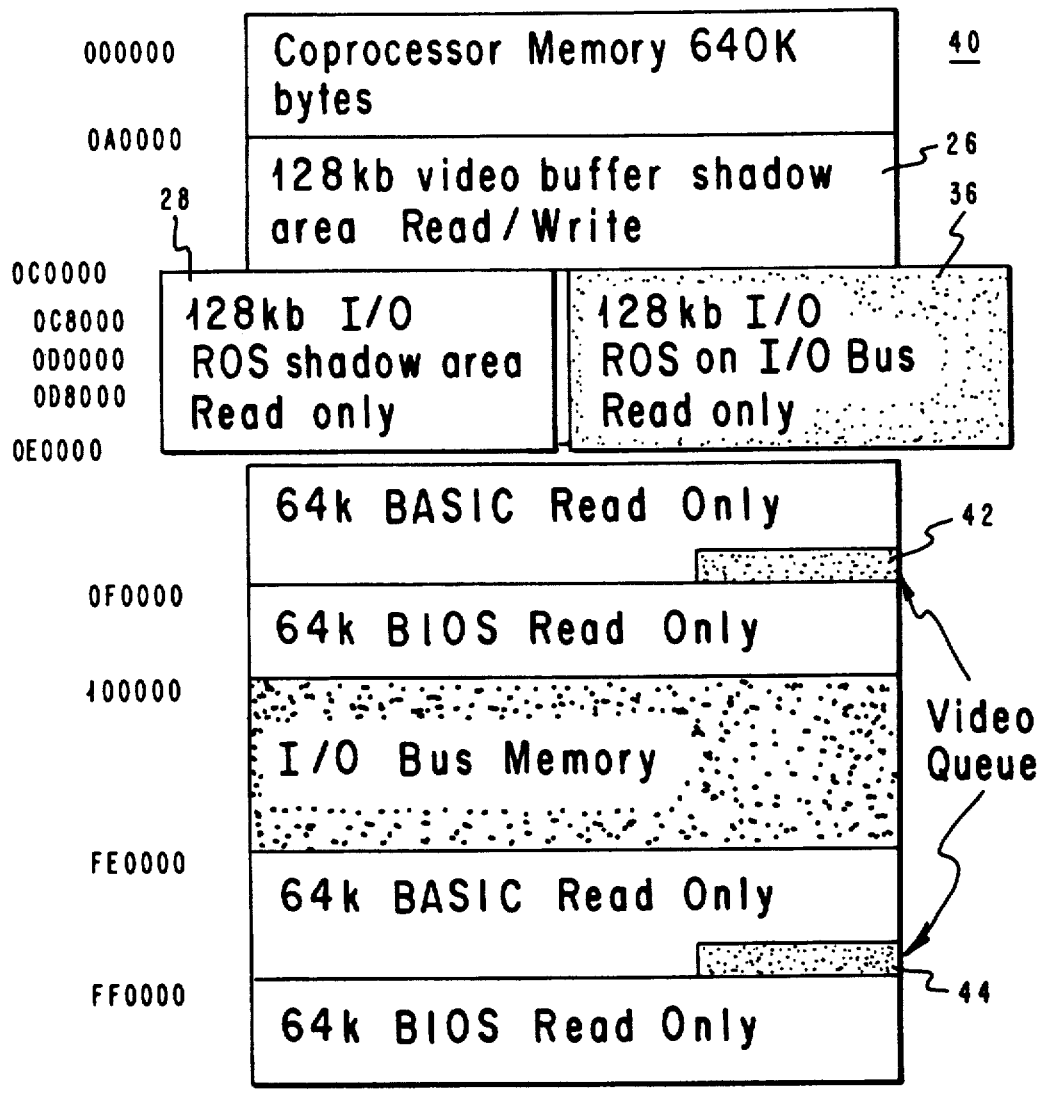
FIG. 2 is a symbolic diagram of the memory map as seen by the coprocessor.

The memory map for the coprocessor module 20 is illustrated in FIG. 2. It is important to understand that this memory map is that seen by the coprocessor 22 and not the master 12 or any other devices connected to the I/O bus 10. The addresses of this memory map vary from $000000_{16}$ to $FFFFFF_{16}$. The memory map 40 is divided into sections in accordance with the addresses that are illustrated to the left of the memory map itself. Memory locations from 000000 to $09FFFF_{16}$ contain the 640K bytes of the active coprocessor memory. The memory locations in area 26 (from addresses 0A0000 to $0BFFFF_{16}$) contain the video buffer shadow area 26 of FIG. 1. The memory area between addresses $0C0000_{16}$ and $0DFFFF_{16}$ is divided into four separately controlled sub-areas. Each sub-area contains either the 128K I/O ROS (Read Only Storage) BIOS shadow area 28 within the RAM 24 or the 128K I/O ROS 36 on the I/O Adapter 34 accessible from the I/O bus 10. Which ROS (28 or 36) is being accessed is determined by the setting of control bits by the master processor 12 on the coprocessor module 20 and which will be described in more detail. Memory area 28 is the BIOS that is loaded by the master processor 12 (FIG. 1) from the I/O adapter 34 (FIG. 1). From address 0E000016 to $0EFFFF_{16}$, 64 kilobytes of the BASIC interpreter is stored except an 8K kilobytes area 42 that is provided for the video queue. The next 64 kilobytes is dedicated to the PC BIOS. The memory locations from address $100000_{16}$ to $FDFFFF_{16}$ is available for addressing the I/O bus 10 or, optionally, additional coprocessor memory. From memory location $FE0000_{16}$ to $FEFFFF_{16}$ is located a 64 kilobytes image of the BASIC interpreter as discussed earlier together with an 8K portion 44 for the video queue. From memory location $FF0000_{16}$ to $FFFFFF_{16}$ is stored a image of the 64 kilobytes BIOS earlier discussed.

Figure 3:
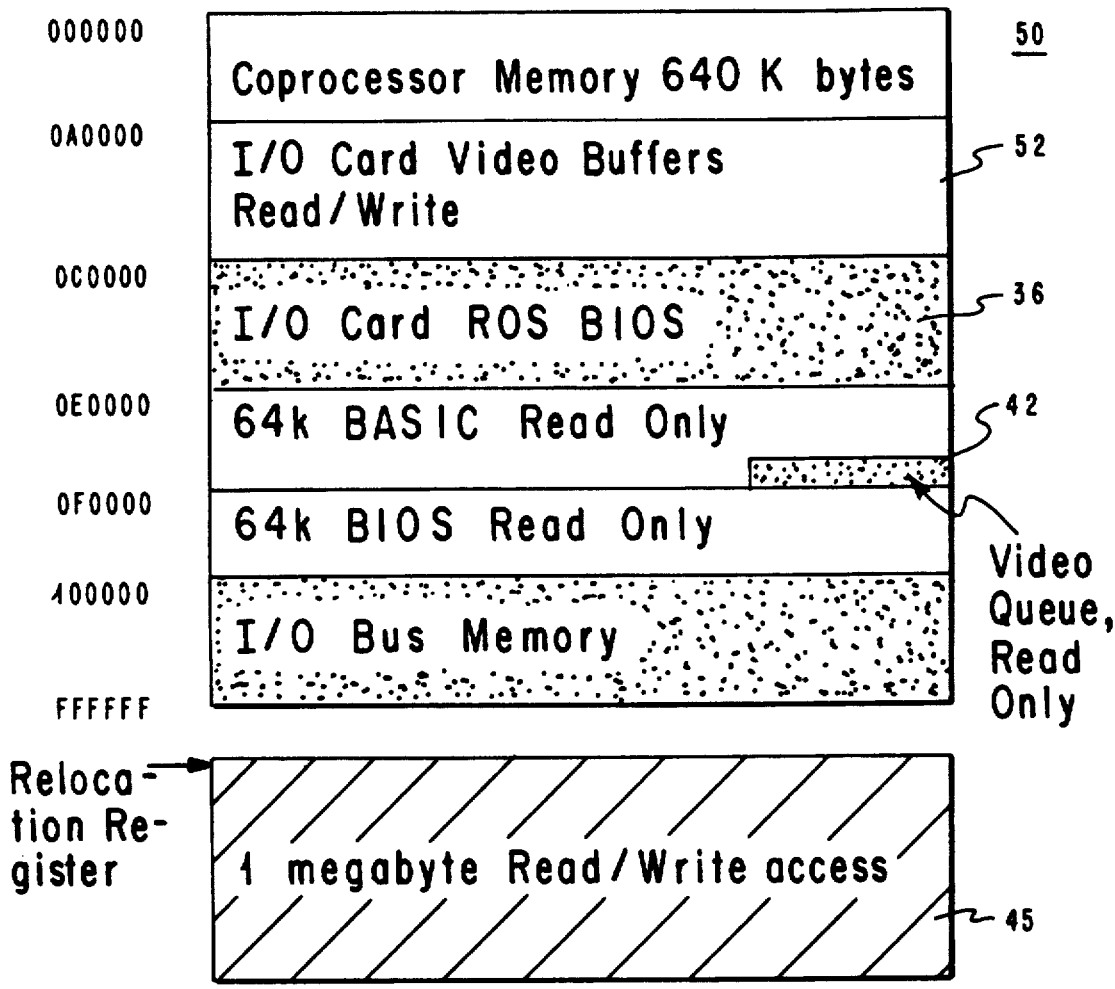
FIG. 3 is a symbolic diagram of the memory map as viewed by the master processor and other devices connected to the information bus.

FIG. 3 illustrates the memory map as seen by the master processor 12 and any other devices accessing the I/O bus 10. The memory map 50 appears similar to the memory map 40 of FIG. 2. However, area 52 is the video adapter 18 video buffer RAM 19. The corresponding memory location on the coprocessor module 20 is the video buffer shadow area 26 (FIG. 2). Likewise, the I/O card ROS BIOS area (from addresses $0C0000_{16}$ to address $0DFFFF_{16}$), is the I/O extension BIOS ROS 36 on the I/O adapter 34 and video adapter 18. From 0EFFFF to $0F0000_{16}$ is the memory area for BASIC except for area 42 which is the video queue memory area and is only accessible for Read operations. From $0F000_{16}$ to $0FFFFF_{16}$ the BIOS is stored and is also only accessible for Read operations. The area from memory address $100000_{16}$ to $FFFFFF_{16}$ is a read/write area for any device such as processor 12 accessing the memory from the I/O bus 10.

Based on the contents of the Relocation register 80, a full 1 megabyte address range 45 provides read/write access to coprocessor RAM 24. The value selected for the Relocation register 80 utilizes protection mechanism on I/O bus 10 to prevent access to space 45 by all but master processor 12.

Video Buffer

As previously discussed, an objective of the present invention is to provide a capability to allow both the master processor 12 (FIG. 1) and the coprocessor 22 (FIG. 1) to access the video adapter 18 and provide video data to the video buffer RAM 19 for display on the video display 17. Since the coprocessor 22 cannot provide video data to the video buffer RAM 19 when the master processor 12 is providing such video data, the coprocessor 22 video data is provided to the RAM 24 in the coprocessor module 20 as previously discussed. While one solution might be to provide a second buffer in the video adapter 18, its maintenance would increase data flow on the I/O bus 10 when both the master processor 12 and the coprocessor 22 would be providing video data. By providing the buffer on the coprocessor module 20, the video data from the coprocessor 22 is recorded without being placed on the I/O bus 10 when the master processor 12 is providing data to the video to the buffer RAM 19.

When the coprocessor 22 video data is to be displayed on display 17, the master processor 12 must access the video buffer area in RAM 24 of the coprocessor module 20 in order to update the video RAM 19. It should be apparent to those skilled in the art that the address of the video buffer RAM 19 on I/O bus 10 must be different than the video buffer area 26 in RAM 24 of the coprocessor module 20 for the master processor 12 to transfer the coprocessor 22 data. It should also be apparent to those skilled in the art, that it is advantageous for the coprocessor 22 to address both the video buffer RAM 19 and the video buffer area 26 in RAM 24 at the same time, i.e. that the two RAM areas would have the same address. One object of the present invention is to provide a solution to this dilemma by enabling the coprocessor 22 to write to one video buffer address and thus write to both the video buffer area 26 and the video buffer RAM 19 simultaneously while also providing the ability for the master processor 12 to independently access the video buffer RAM 19 and the video buffer area 26 separately and independently. This is accomplished by having the coprocessor 22 access the RAM 24 in accordance with one address map (FIG. 2) while allowing the master processor 12 to access to RAM 24 using a different address map (FIG. 3).

Another object of the present invention is to provide a expedient way for the master processor 12 to emulate a PC compatible display on a new generation display that may be located at a different address or require a different protocol not recognized by the code running in the coprocessor. In this event, the master processor 12 reads the video buffer shadow area 26 and drives video adapter 18 by writing video buffer RAM 19 with a suitably translated version of the contents of video buffer shadow area 26. After the initial translation, therefore, the only changes that need to be made to the previous coprocessor 22 video data stored in the video buffer RAM 19 are the updates that have been made to this coprocessor 22 video data since the last translation. The present invention provides for such expedient updating by providing a video queue 30 in RAM 24. This video queue 30 is automatically updated with the addresses of all the video data used to update the video buffer 26 by the coprocessor 22. Therefore, only the updated data is loaded across the the I/O bus 10 and translated by the master processor 12 to update the coprocessor 22 video image in the video buffer RAM 19.

Figure 4:
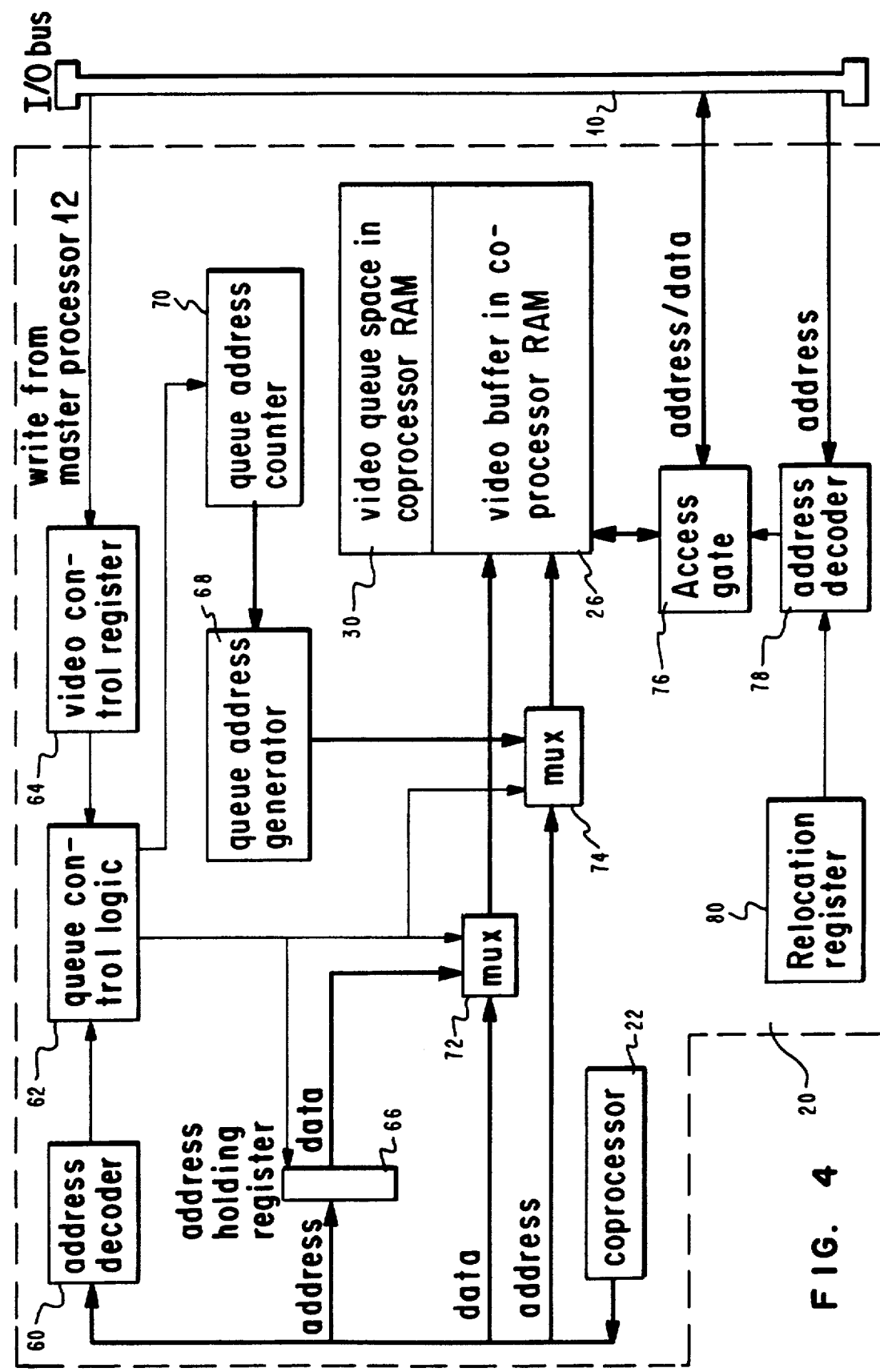
FIG. 4 is a block diagram of the coprocessor, video queue access and write control circuitry.

FIG. 4 illustrates the access to the video buffer 26 by both the I/O bus 10 and the coprocessor 22. The master processor 12 accesses the video buffer 26 by the I/O bus 10 through an address decoder 78. The address decoder 78 determines in combination with the relocation register 80 whether the address on the I/O bus 10 is intended to address address space 30 or 26. The relocation register 80 stores an address offset that is used to determine where address space 45 resides in the address map for the master processor 12 (see FIG. 3). When these addresses are received, relocated bus access is provided to the entire coprocessor address map including video buffer 26 and the video queue 30. Therefore, the master processor 12 can then read and write data from the video queue 30 and the video buffer 26.

As previously discussed, circuitry is provided to allow the master processor 12 to read only the updated video data in video buffer 26. This feature consists of a technique of automatically generating a write of information to the video queue 30 when the coprocessor 22 writes data to the video buffer 26. This process is controlled by the video control register 64 which receives command control data from the master processor 12 over I/O bus 10. Specifically, the video control register 64 is set to determine over which address ranges the write address is entered into the queue 30. The output of the video control register 64 is provided to the video control logic 62. The queue control logic 62 controls all memory accesses both internal and external while the queue address information and data are multiplexed into the coprocessor module 20 RAM 24. The queue control logic 62 also updates the queue address generator 70.

When the coprocessor 22 is providing data to the video buffer 26 and the video data is not being provided over the I/O bus 10, the video control register 64 indicates to the queue control logic 62 that the video queue 30 is to store addresses of all changes to the video buffer 26. Therefore, when the coprocessor 22 provides an update to the video buffer 26, the queue control logic 62 provides for the storage of this data in the video buffer 26 while, simultaneously within the write cycle, providing the address of this change of the video buffer 26 to the video queue 30. Therefore, when the video buffer 26 updates are to be provided over the I/O bus 10 to the video adapter RAM 19, the master processor 12 merely updates the data contained in the addresses stored in the video queue 30.

In FIG. 4, when the coprocessor is providing an update to the video buffer 26 the actual address of the update is provided to multiplexer 74 which is controlled by the queue control logic 62 to write the updated video data through multiplexer 72 into the video buffer RAM area 26. Additionally, the queue control logic 62 delays the completion of this memory access to allow for the address of the change to be set in holding register 66. Then, after the video buffer data is updated in the video buffer 26, the queue control logic 62 updates the video queue 30 with the address of the change. The address of the change is provided through multiplexer 72 to video queue 30. The queue address where this change address is being stored is gated through multiplexer 74. The queue address is received from the queue generator 68. The queue generator 68 is connected to a queue address counter 70 that merely increments the queue address each time a entry is made into the video queue 30. To the RAM 24, the operation appears as two data writes. To the coprocessor 22, the operation appears as a single write operation where two data entries are made simultaneously.

Figure 5:
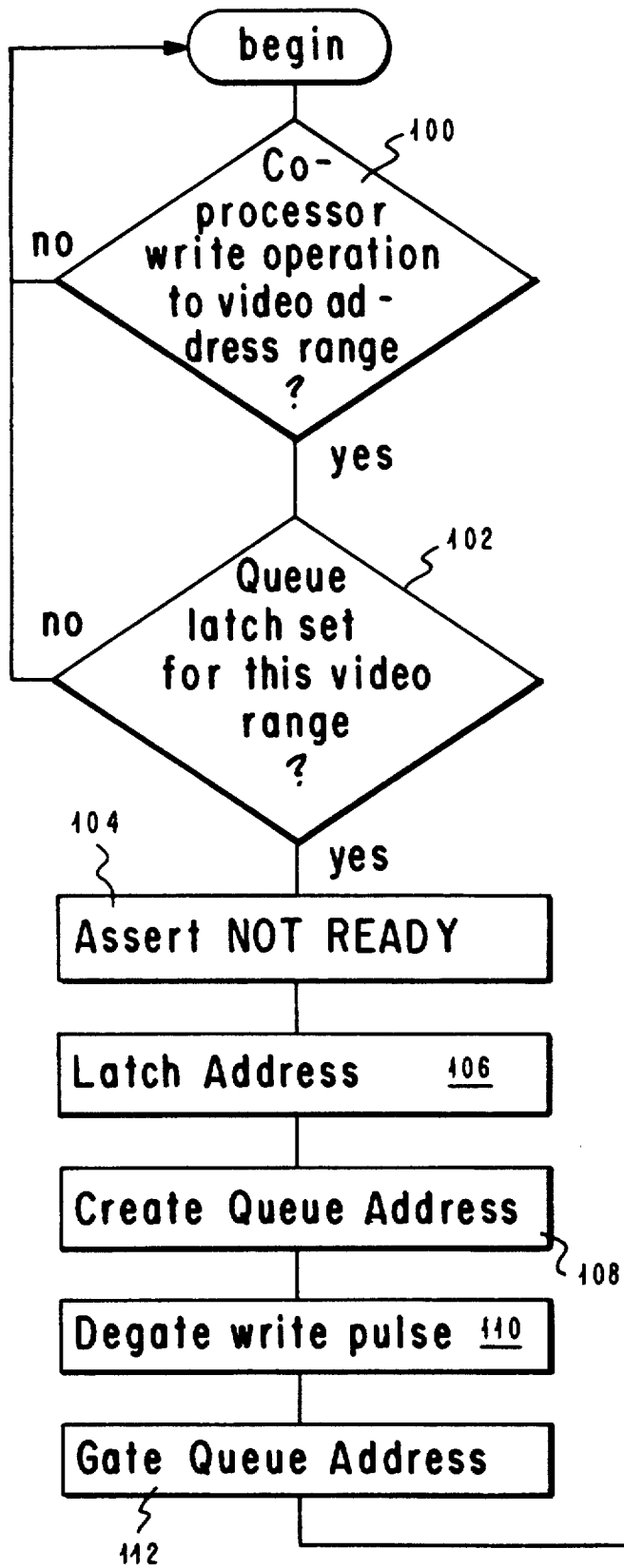
FIG. 5 is a flowchart illustrating the operation of the queue control logic circuit.
Figure 5:
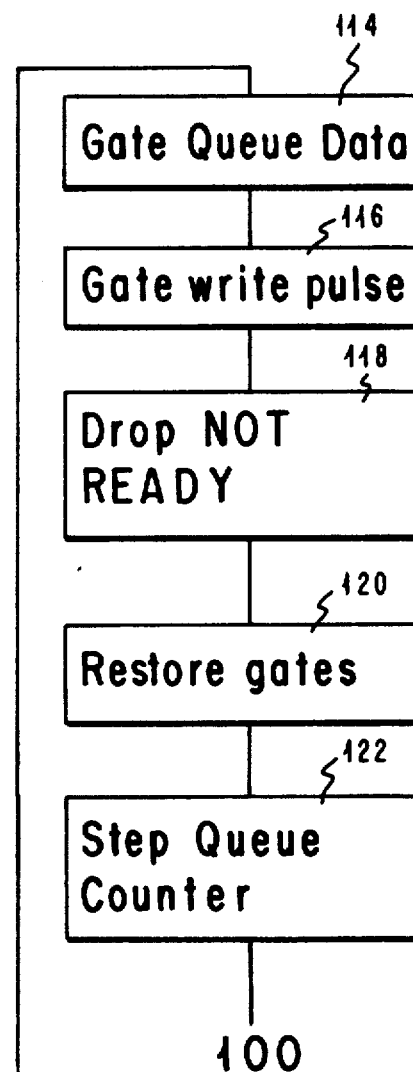

FIG. 5 is an illustration of the operation flow in queue control logic 62. The logic 62 first determines from the address decoder 60 if the coprocessor 22 is attempting to write data into the video buffer range in step 100. If so, in step 102, it is determined whether or not the queue latch in the video control Register 64 is set to store data for this address range. In step 104, logic 62 sends a Not Ready signal 206 (FIG. 6) to extend the coprocessor memory access cycle. In step 106, the low order 16 bits of the address from the coprocessor 22 are latched into the address holding register 66. In step 108, the address for the queue 30 is created by concatenating a fixed high order address to the contents of the queue counter 70 through the queue address generator 68. At this time, simultaneously with the operation of the queue control logic 62, the video buffer 26 receives the address of the change from multiplexer 74 and the data for the change from multiplexer 72. After a suitable delay to permit coprocessor RAM 24 to be properly written, the write pulse is degated in step 110 to allow the address to be changed. At the end of this original write cycle, the video queue control logic 62 in step 112 then writes the changed address into the video queue 30 by replacing the coprocessor address with the queue address from the queue generator 68 through multiplexer 74. In step 114, the address holding register contents 66 containing the address of the change is then provided as data to multiplexer 72 to the video queue 30. The queue control logic 62 then reenables the Write pulse to memory in step 116. In step 118, the Not Ready signal is then dropped which allows the coprocessor 22 to proceed. At the end of this write cycle, in step 120, the queue control logic 62 restores the multiplexers 72 and 74. In step 122, the queue address generator 68 is incremented to point to the next queue address.

Figure 6:
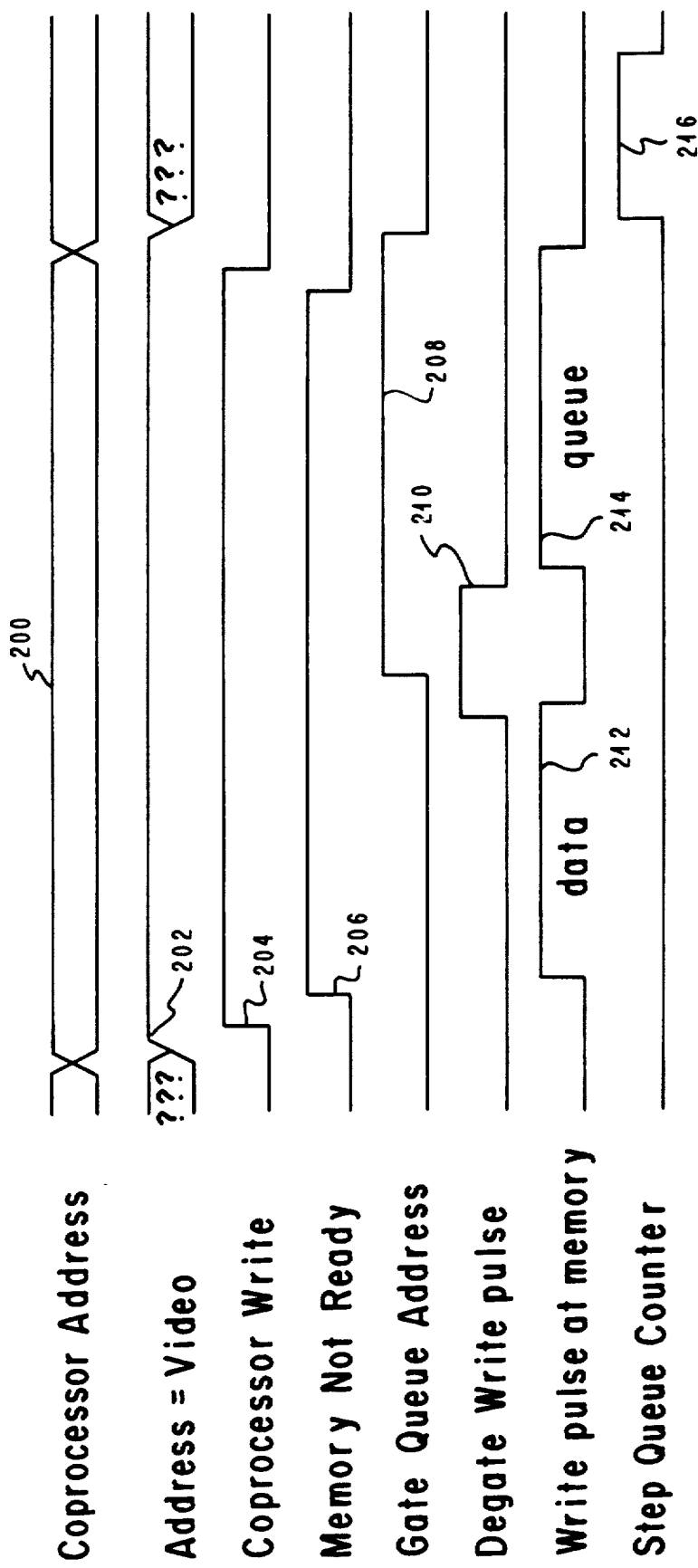
FIG. 6 is a timing diagram illustrating the double write operation by the queue control logic.

FIG. 6 illustrates the timing diagram for the operation of the queue control logic 62. The coprocessor initially provides an address to change video data in the video buffer 26 which is illustrated as signal 200. The address decoder provides a signal 202 indicating to the queue control logic 62 that the coprocessor address is for the video buffer 26. The coprocessor 22 provides a Write strobe signal 204. The queue control logic 62 provides a Not Ready signal 206 to the coprocessor 22 indicating that the write cycle is to be extended. The data from the coprocessor 22 is then loaded by the signal 212 to the RAM 24. The queue control logic 62 provides a Degate Write pulse 210 to multiplexer 72 and 74 to degate the address and data from the memory RAM 24 and to the Address Holding Register 66 to gate the address. The queue control logic 62 then provides the Gate Queue Address signal 208 to multiplexers 72 and 74. The degate write pulse 210 is then dropped and the Write pulse 214 raised to write the address of the change through multiplexer 74 to the video queue 30 at the queue address from multiplexer 72. The queue control logic 62 then provides the Step Queue Counter Signal 216 to increment the queue address counter 70.

In FIG. 7, the operation of coprocessor 20 is illustrated when the coprocessor 22 is providing video data to both the video buffer 26 and the video adapter 18. In this configuration, the video control register 64 and the address decoder 60 control the bus control logic 82 which provides the video data over the I/O bus 10 to the video adapter 18. As previously discussed in FIG. 4, when the coprocessor 22 is providing information to video adapter 18 it simultaneously provides information to the video buffer 26. This is accomplished by taking the video address and video data from coprocessor 22 and providing it to both the internal RAM 24 to the video buffer 26 and through the bus control logic 82 onto the I/O bus 10 to the video adapter 18. Since the addresses for both the video buffer 26 and the video adapter 18 are the same to the coprocessor 22, the coprocessor 22 does not have to perform two separate write operations. A single write operation provides the data to both buffer 26 and the adapter 18. The determination of whether or not data is written on the I/O bus is determined by the bits set in the video control register 64. These bits are set by the master processor 12. Likewise, the master processor 12, can access the data through the video buffer 26 as previously described using an offset address in the relocation register 80 and the address over the I/O bus 10 which is decoded through address decoder 78 and provided to the access gate logic 76 to access the data at the offset address in the video buffer 26.

Figure 8:
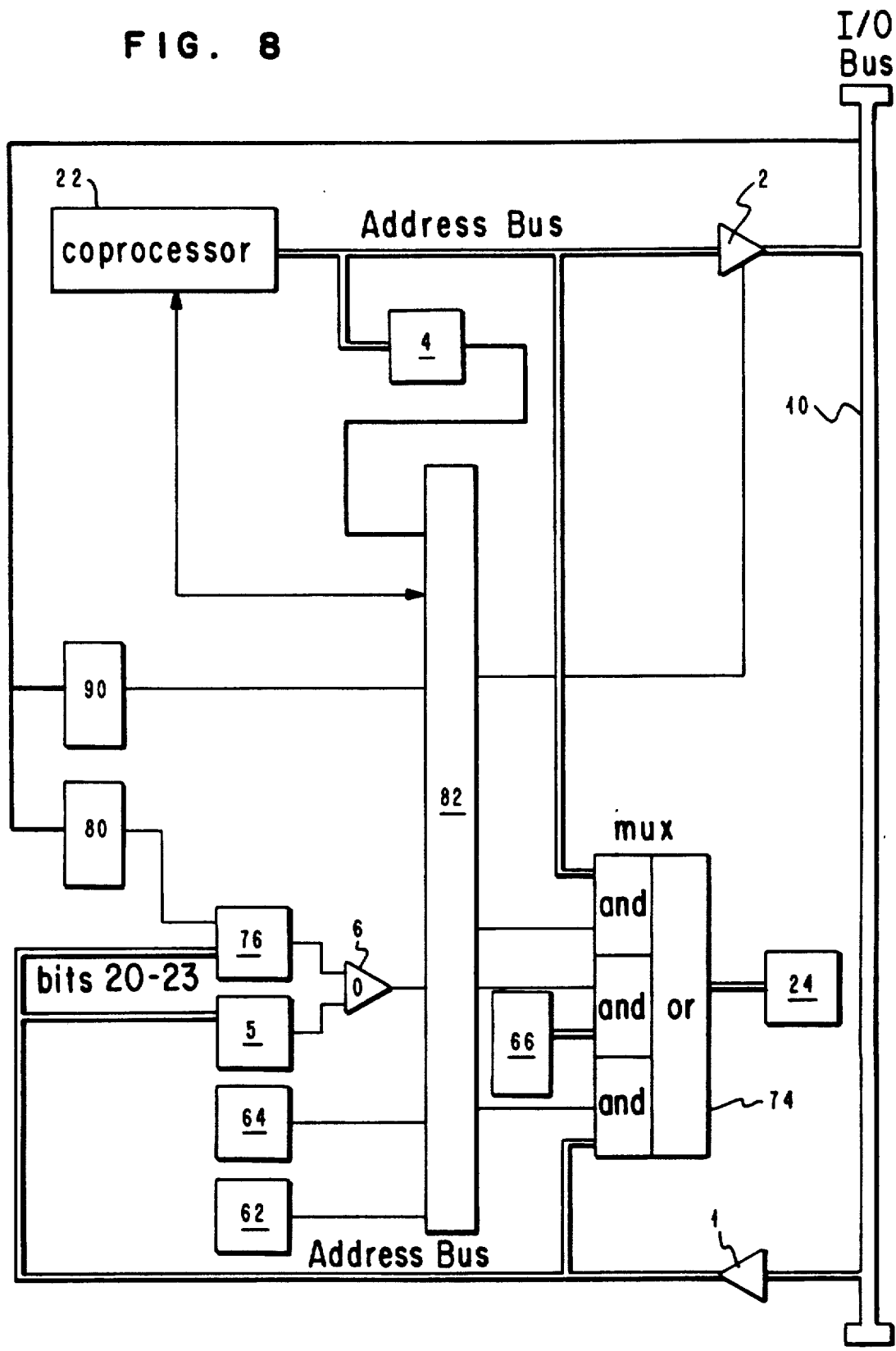
FIG. 8 is a schematic block diagram of the memory address gating logic for the coprocessor.

FIG. 8 is an illustration of the address gating logic for the coprocessor module 20. The purpose of FIG. 8 is to illustrate how both the coprocessor 22 and the master processor 12, through the I/O bus 10, access the internal RAM 24 of the coprocessor module 20. The BIOS mode register 90 and the relocation 80 are addressable by the master processor 12 through the I/O bus 10. As previously explained, the BIOS register 90 is used when the master processor 12 provides special operating system software to area 32 of RAM 24 (see FIG. 1). When the coprocessor 22 attempts to address the internal RAM 24, an address is provided to an address decoder 4 which determines that the coprocessor 22 is attempting to access internal RAM 24. The decoder logic 4 then provides signals to the memory access circuit 82 specifying that access is required and identifying access to controlled or Read Only areas. If the access from coprocessor 22 is not for the internal RAM 24, the address is provided through the tristate driver 2 to the I/O bus 10 and bus 10 must be arbitrated for before access. Bus control logic 82 would signal Not Ready to coprocessor until bus 10 is obtained. Likewise, if the master processor 12 is attempting to address the internal/ RAM 24, the address is received through the receiver 1-. This address is provided simultaneously to the multiplexer 74, to the compare circuit 76 and to the address decoder 5. If the address received by the comparator 76, provides a match output to OR gate 6, then the master processor 12 is attempting to access the relocated memory map as previously discussed. If the address is decoded by decode logic 5, and a signal is provided to OR gate 6, the master processor 12 is attempting to address the lower 640K or the upper 128K of the memory map. In either event multiplexor 74 is enabled to provide access from the External Bus To Memory 24. The memory access timing 82 also receives an input from the queue control logic 62 as previously discussed. Control lines 8 connected between the coprocessor 22 and the memory access timing circuit 82 provide control and timing signals for the coprocessor 22 accessing the internal RAM 24 and the coprocessor 22 accessing the I/O bus 10. The output of the memory access timing circuit 82 is provided to the multiplexer 74 which multiplexes one of the several addresses to access memory location in the internal RAM 24. Queue Address Generator 68 is connected to multiplexer 74 to provide the address for writing the video Queue as previously discussed under control of Queue Control Logic 62.

Figure 9:
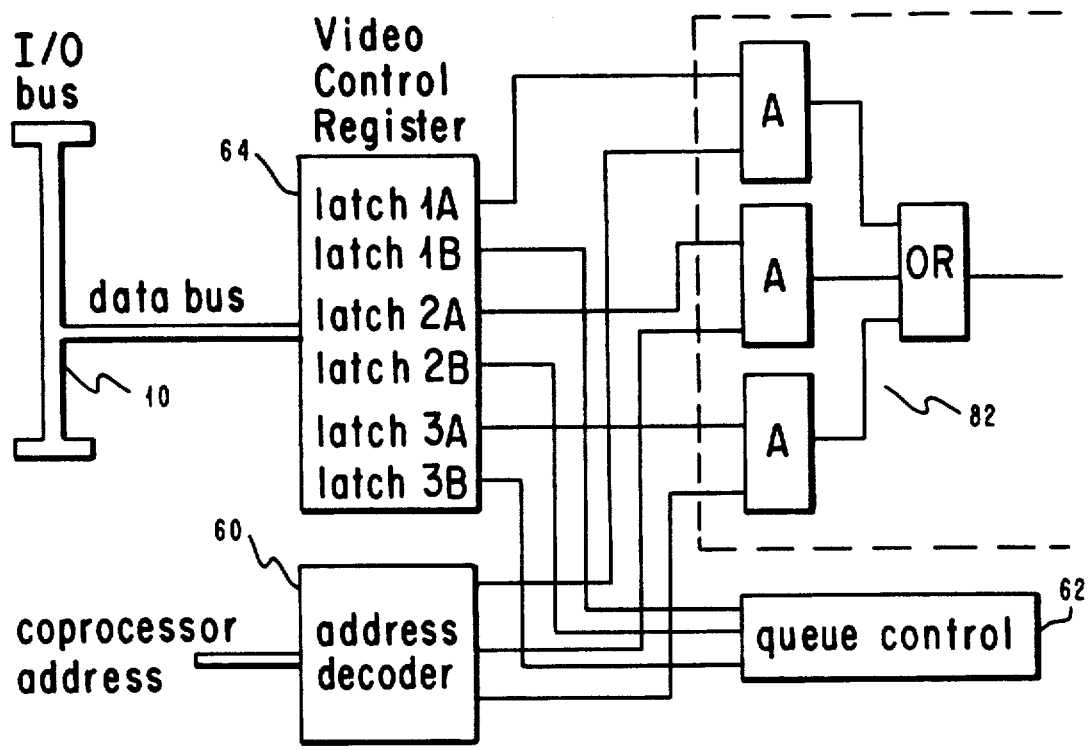
FIG. 9 is a block diagram of the video control register circuitry.

FIG. 9 is a diagram of the video control register 64 connected to the I/O bus 10. The video control register is set by the master processor 12 over the I/O bus 10. The setting of the video control register 64 determines which address range(s) is to be used by the video queue 30 in the internal RAM 24. Therefore, when an address is received from the coprocessor 22 through the address decoder 60, the address decoder 60 provides a signal on the indicated lines which is combined in the memory access timing circuit 82 with the contents of latches 1A, 2A and 3A the video control register 64 to determine if (1) coprocessor data is to be written both to the RAM 19 and the internal RAM 24, or (2) the data is only to be written RAM 24. As previously explained, this enables the coprocessor 22 write simultaneously to two separate memory areas under the control of the master processor 12 when the coprocessor 22 has control of the display 17 or, alternatively, only to write to the internal RAM 24 to update the video buffer 26 when the master processor 12 has control of display 17. A second set of latches (1B, 2B, 3B) within Video Control Register 64 determine through Queue Control Logic 62 whether the address of the video access should be written in queue area 42.

Figure 10:
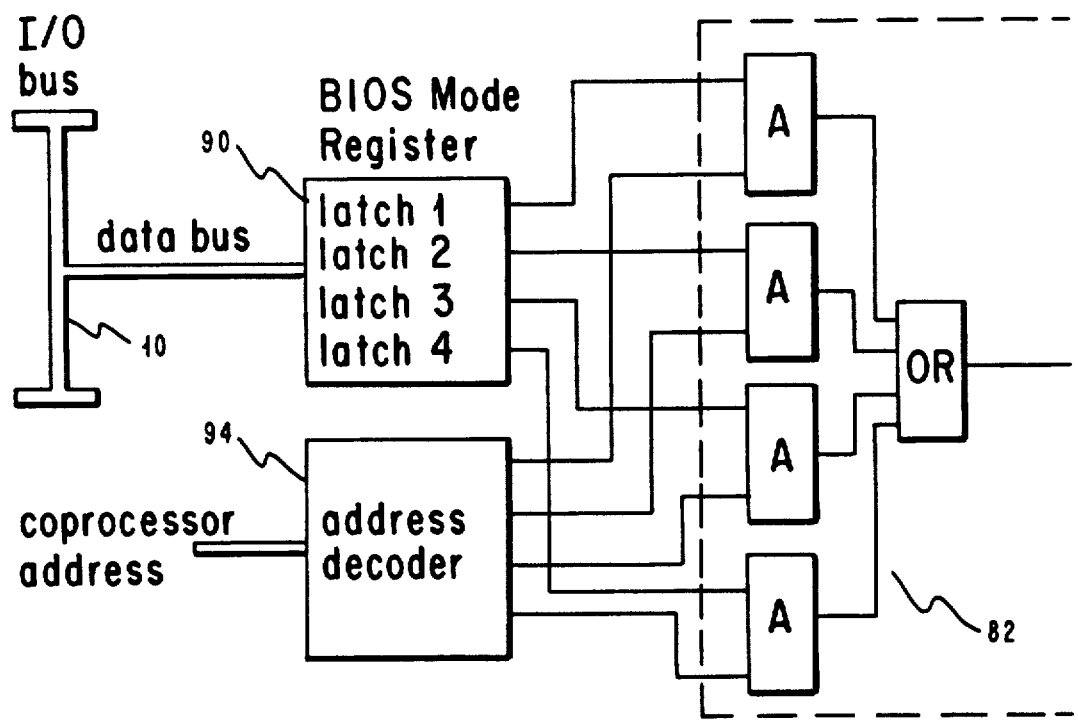
FIG. 10 is a schematic block diagram of the binary input/output system control register circuitry.

FIG. 10 illustrates the BIOS mode register 90 connected to the I/O bus 10. The BIOS mode register 90 is loaded by the master processor 12. Address decoder 94 receives addresses from the coprocessor 22 to determine if the addresses are any in of four separate address spaces as illustrated. The output of address decoder 94 is combined with settings of BIOS mode register 90 and the memory access logic 82 to determine if the coprocessor 22 is to read the BIOS data from the internal RAM 24 or from the I/O adapter 34 (FIG. 1). As previously, discussed this enables the processor to control where the coprocessor 22 is accessing the operating system. It is important to understand that this feature adds to the efficiency of operation of the coprocessor 22 by permitting the master processor 12 to direct the coprocessor 22 to read its BIOS in the internal RAM 24.

This RAM 24 has been preloaded by the master processor 12 at the initial program load phase of coprocessor 22. It should be understood that when the coprocessor 22 is accessing the I/O adapter 18 or 34 to read the BIOS data, the access is an 8 bit access requiring several I/O bus accesses to fetch a 32-bit word. On the other hand, the master processor 12 accesses the I/O adapters 18 or 34 only one time during initial program load time and transfers data 32 bits at a time to the internal RAM 24 of the coprocessor module 20. Therefore, when the coprocessor 22 needs to access BIOS information, it is able to do so 32 bits wide on RAM 24, the access is accomplished more quickly and without an excess number of data transfers across the I/O bus 10.

Figure 11:
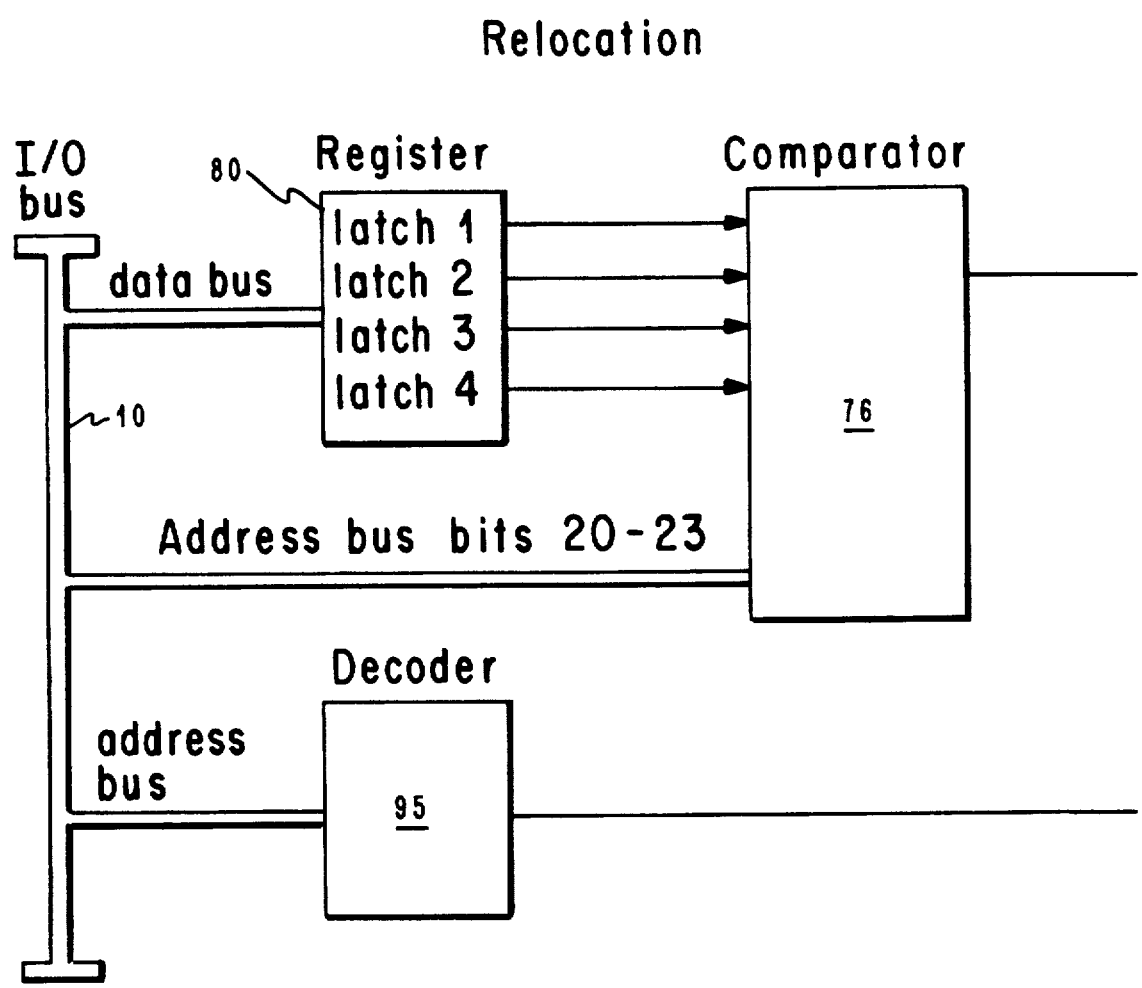
FIG. 11 is a block diagram of the memory relocation circuitry.

FIG. 11 illustrates the relocation register 80 which is also loaded by the master processor 12 from I/O bus 10. As previously discussed, the comparator 76 is used to compare the I/O bus 10 address with the stored address in the relocation register to determine if the master processor 12 is to access the whole one megabyte of the internal RAM 24. Decoder 95 examines the master processor address to determine if it is only to access the first 640K and last 128K of the internal RAM 24.

While this invention has been described with reference to the illustrated embodiment, this description is not intended to be construed in a limiting sense. Various modifications of the illustrative embodiment, as well as any other embodiments of the inventions will be apparent to those persons skilled in the art in reference to that description. It is therefore, contemplated that the appending claims will cover any such modifications or embodiment as fall within the true scope of this invention.

We claim:

1. A memory system comprising:
   a first plurality of memory locations for storing information in response to access commands having addresses within a first address range;
   a second plurality of memory locations for storing information within a second address range; and
   means for writing information in said first plurality of memory locations in response to write commands having addresses within said first address range and, within a same write cycle, writing each write command address in said second plurality of memory locations.

2. A memory system according to claim 1 wherein said means for writing information includes means for generating addresses in said second address range for the storage of said write command addresses in said second plurality of memory locations.

3. A memory system according to claim 2 wherein said address generating means generates said addresses in sequence according to an occurrence of the write commands.

4. A memory system according to claim 3 wherein said address generating means provides a signal when the number of addresses stored in said second plurality of memory locations is greater than a preselected number.

5. A memory system according to claim 1 further including means responsive to read commands for reading either said first or second plurality of memory locations.

6. A memory system according to claim 1 wherein said writing means includes means for inhibiting writing in said second plurality of memory locations by write commands.

7. A data processing system comprising:
- a first processor means for executing read/write access commands;
- a second processor means for executing read/write access commands;
- an information bus means connected to said first processor means for the transfer of information including data, addresses and control information;
- a first memory means connected to the information bus for the storage of information in locations having addresses within a first address range; and
- a second memory means connected to the information bus for the storage of information in locations having addresses within a second address range, said second memory means including:
  - a first plurality of memory locations for storing information in response to access commands having addresses within a first portion of said second address range;
  - a second plurality of memory locations for storing information within a second portion of said second address range;
  - means for writing information in said first plurality of memory locations in response to write commands having addresses within said first portion of said second address range and, within a same write cycle, writing each write command address in said second plurality of memory locations; and
  - said first processor means including means for accessing said second portion of said second memory means to obtain data written in said first portion from said write commands.

8. A data processing system according to claim 7 wherein said second processor means includes means to provide said data written in said first portion of said second memory means to said first memory means to update information contained therein.

* * * * *